United States Patent [19]

Komiya et al.

[11] Patent Number: 5,753,872
[45] Date of Patent: May 19, 1998

[54] ACCELERATION SWITCH

[75] Inventors: Hirokazu Komiya; Yoshifumi Imai; Hiroshi Iiyama, all of Saitama, Japan

[73] Assignee: Jeco Co., Ltd., Japan

[21] Appl. No.: 764,049

[22] Filed: Dec. 12, 1996

[30] Foreign Application Priority Data

Dec. 18, 1995 [JP] Japan .................. 7-328817

[51] Int. Cl.$^6$ .................................................. H01H 35/14
[52] U.S. Cl. .......................... 200/61.45 R; 200/61.45 M; 200/61.5
[58] Field of Search .............. 200/61.45 R, 61.48, 200/61.49, 61.5, 61.51, 61.52, 61.53, 61.83, DIG. 29

[56] References Cited

U.S. PATENT DOCUMENTS

| | | | |
|---|---|---|---|
| 1,662,979 | 3/1928 | Nelson | 200/DIG. 29 |
| 4,115,995 | 9/1978 | Brien | 200/61.45 M |
| 4,326,111 | 4/1982 | Jackman | 200/61.5 X |
| 4,378,475 | 3/1983 | McNiel | 200/61.45 M X |
| 5,597,066 | 1/1997 | Burmester | 200/61.45 M X |

FOREIGN PATENT DOCUMENTS

WO81/00325  2/1981  WIPO ................. H01H 35/14

*Primary Examiner*—J. R. Scott
*Attorney, Agent, or Firm*—Blakely Sokoloff Taylor & Zafman

[57] ABSTRACT

In an acceleration switch, a magnetic contact opening/closing member is disposed at a horizontal initial position above a holding member. The end portion of the contact opening/closing member is pushed upward from the initial position by a ball that rolls along the tilt surface of the holding member with an inertia. First and second leaf springs are disposed to oppose each other on rolling and non-rolling sides of the ball through the holding member, and have upper free ends for sandwiching two end portions of the contact opening/closing member at the initial position. At least the first leaf spring is made of a conductive material and imparted with properties to swing in a direction to come close to the second leaf spring. When the contact opening/closing member is at the initial position, the first leaf spring is pressed by the contact opening/closing member in a direction to come close to an electrode plate against the swing properties and comes into contact with the electrode plate. When the contact opening/closing member is shifted from the initial position, the first leaf spring swings in a direction to separate from the electrode plate in accordance with the swing properties to be disconnected from the electrode plate.

8 Claims, 5 Drawing Sheets

ACCELERATION SWITCH

BACKGROUND OF THE INVENTION

The present invention relates to an acceleration switch in which a ball rides up the tilt surface of a ball holding member with an inertia in accordance with an acceleration to drive a contact opening/closing member.

Figure 7:
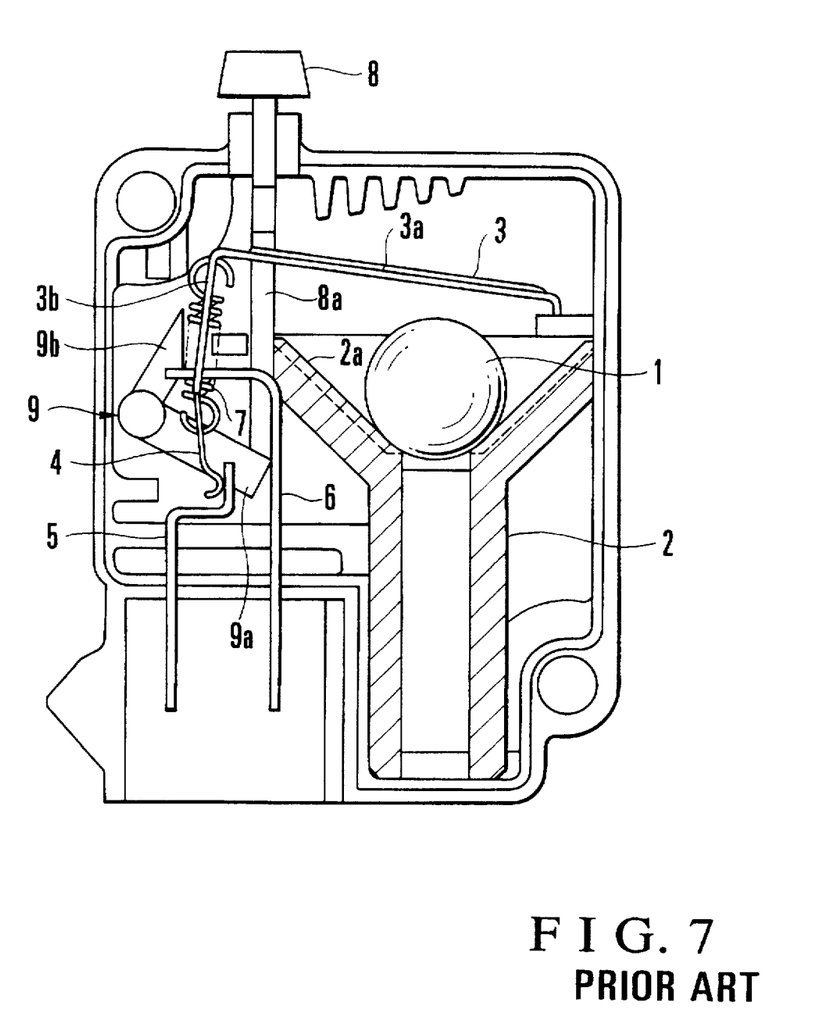
FIG. 7 is a sectional view showing the schematic arrangement of a conventional acceleration switch.

A conventional acceleration switch of this type, for example, is an inertia switch device disclosed in WO 81/00325. FIG. 7 shows a conventional acceleration switch indicated in this reference. Referring to FIG. 7, reference numeral 1 denotes a ball (inertia mass) which rolls in accordance with an acceleration; 2, a funnel-like ball holding member (frusto-conical seat) having a tilt surface (sloping side) 2a along which the ball 1 rolls; and 3, a contact opening/closing lever (actuating member) disposed above the ball holding member 2. When the contact opening/closing lever 3 is pushed up by the ball 1 rolling along the tilt surface of the ball holding member 2, a movable segment (movable contact member) 4 is separated from a first electrode (electrical terminal) 5, thereby opening the contact.

The contact opening/closing lever 3 is constituted by a pressure-receiving portion (arm) 3a and a movable segment driving portion (bifurcated arm) 3b. The pressure-receiving portion 3a extends substantially horizontally above the ball holding member 2 and has one end which abuts against a block formed in the housing of the acceleration switch. The movable segment driving portion 3b extends from the other end portion of the pressure-receiving portion 3a downward beside the ball holding member 2. The pressure-receiving portion 3a and the movable segment driving portion 3b form the contact opening/closing lever 3 to have an L-shaped section. The lower end of the movable segment driving portion 3b is pivotally supported by a second electrode (electrical terminal) 6 disposed between the first electrode 5 and the ball holding member 2, and the movable segment 4 is coupled to the movable segment driving portion 36 through a hinge mechanism.

The movable segment 4 extends downward from its portion where it is coupled to the movable segment driving portion 3b. The movable segment 4 is tilted to lock the lower end portion of a tension coil spring (helical tension spring) 7 such that it becomes substantially V-shaped when seen from a side as it is coupled to the movable segment driving portion 3b. The upper end portion of this tension coil spring 7 is locked by the upper end of the movable segment driving portion 3b. More specifically, in an inoperative state shown in FIG. 7, the movable segment 4 is biased by the tension coil spring 7 to pivot counterclockwise in FIG. 7 about its upper end as the fulcrum so that its lower end portion presses against the first electrode 5. In this state, an electrical circuit is formed to extend from the first electrode 5 to the second electrode 6 through the movable segment 4 and the movable segment driving portion 3b.

When the ball 1 rolls along the tilt surface 2a of the ball holding member 2 with an inertia to move toward the movable segment driving portion 3b of the contact opening/closing lever 3, the pressure-receiving portion 3a of the contact opening/closing lever 3 is pressed by the ball 1 to move upward. Upon movement of the pressure-receiving portion 3a, the contact opening/closing lever 3 pivots counterclockwise in FIG. 7 about its coupling portion with the second electrode 6 as the center. Then, the upper end of the tension coil spring 7 moves to the opposite side over the neutral point, so that the movable segment 4 is biased clockwise in FIG. 7 so that its lower end portion separates from the first electrode 5. As a result, the electrical circuit described above is opened.

To reset the electrical circuit from the open state, a reset button 8 is depressed downward. This reset button 8 has an actuator (stem) 8a supported by the housing of the acceleration switch to be vertically movable, and is coupled to a link mechanism (shaft) 9 through this actuator 8a. The link mechanism 9 has an arm (limb) 9a against which the distal end of the actuator 8a abuts and an arm (limb) 9b which abuts against the tension coil spring 7. The arms 9a and 9b are integrally formed in an L shape and is pivotally mounted in the housing of the acceleration switch.

When the reset button 8 is depressed downward, the actuator 8a presses the arm 9a of the link mechanism 9, so that the link mechanism 9 pivots clockwise. Accordingly, the arm 9b of the link mechanism 9 presses the tension coil spring 7 to reset the tension coil spring 7 to the inoperative position over the neutral point. When the tension coil spring 7 moves over the neutral point, the lower end portion of the movable segment 4 presses against the first electrode 5 again, thereby closing the electrical circuit (described above).

However, when the arrangement of indirectly driving the movable segment 4 with the contact opening/closing lever 3, as described above, is employed, to obtain an acceleration switch having a high reliability, the movable segment driving portion 3b of the contact opening/closing lever 3, the movable segment 4, the tension coil spring 7, the second electrode 6, and the like must be fabricated with high precision. In the conventional acceleration switch, since many types of components must be fabricated at high precision, the manufacturing cost is increased.

In the conventional acceleration switch, since a hinge mechanism is interposed in the electrical circuit system, when vibration is applied, the electrical circuit can be instantaneously opened even though the contact opening/closing lever 3 is not operated. That is, chattering can occur easily in the inoperative state.

Furthermore, in the conventional acceleration switch, the link mechanism 9 having the two arms 9a and 9b is interposed in a reset system that manually resets the open electrical circuit to the closed state. Therefore, a space where the arms 9a and 9b can pivot must be formed in the housing, leading to a large-sized housing.

SUMMARY OF THE INVENTION

It is an object of the present invention to provide an acceleration switch in which the number of components is reduced to decrease the cost.

It is another object of the present invention to provide an acceleration switch in which occurrence of chattering in the inoperative state is prevented.

It is still another object of the present invention to provide an acceleration switch which is decreased in size.

In order to achieve the above objects, according to the present invention, there is provided an acceleration switch comprising a spherical object, a holding member having a tilt surface along which the spherical object rolls and holding the spherical object in a bottom portion of the tilt surface, a magnetic contact opening/closing member disposed at a horizontal initial position above the holding member, an end portion of the contact opening/closing member being pushed upward from the initial position by the spherical object that rolls along the tilt surface of the holding member with an inertia, a first permanent magnet for attracting the contact opening/closing member at the initial position with a first predetermined holding force, first and second leaf springs disposed to oppose each other on rolling and non-rolling sides of the spherical object through the holding member and having upper free ends for sandwiching two end portions of the contact opening/closing member at the initial position, at least the first leaf spring being made of a conductive material and imparted with properties to swing in a direction to come close to the second leaf spring, and an electrode plate disposed on a counter-second leaf spring side at a predetermined gap from the first leaf spring, wherein when the contact opening/closing member is at the initial position, the first leaf spring is pressed by the contact opening/closing member in a direction to come close to the electrode plate against the swing properties and comes into contact with the electrode plate, and when the contact opening/closing member is shifted from the initial position, the first leaf spring swings in a direction to separate from the electrode plate in accordance with the swing properties to be disconnected from the electrode plate.

DESCRIPTION OF THE PREFERRED EMBODIMENT

An acceleration switch according to the present invention will be described in detail with reference to the accompanying drawings. A case will be described in which the acceleration switch is connected to the power supply circuit of the fuel supply pump of an automobile.

Figure 1:
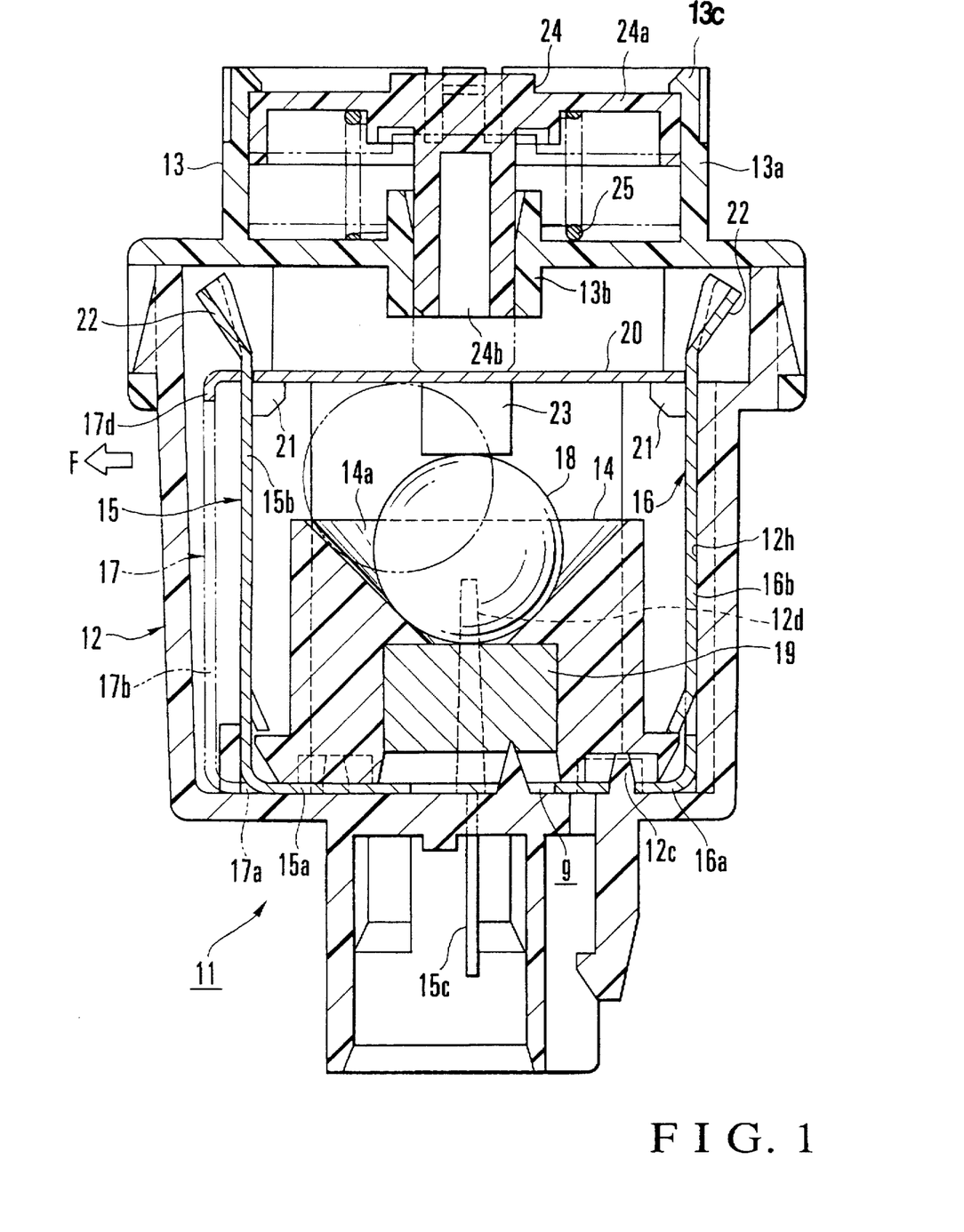
FIG. 1 is a longitudinal sectional view showing an acceleration switch according to an embodiment of the present invention.

Referring to FIG. 1, reference numeral 11 denotes an acceleration switch. The acceleration switch 11 has a bottomed cylindrical housing body 12 which is open upward and a cover 13 for closing the opening at the upper portion of the housing body 12. The housing body 12 incorporates a switch mechanism (to be described later), and the cover 13 incorporates a reset mechanism (to be described later).

This acceleration switch 11 is used by fixing it to, e.g., an automobile body (not shown), such that the inner bottom surface of the housing body 12 is horizontal. When fixing the acceleration switch 11 to the automobile body, it is mounted such that a direction indicated by an arrow F in FIG. 1 corresponds to the front side of the body. More specifically, in mounting, mounting brackets 12a (see FIGS. 2 and 6) of the housing body 12 are positioned to correspond to the front side (traveling direction) of the body. With this arrangement, when the automobile makes a sudden stop, an inertia force acts on the acceleration switch 11 in the direction of the arrow F in FIG. 1.

The housing body 12 is integrally made of a synthetic resin, and a ball holding member 14 arranged at the center of its inner bottom portion, leaf springs 15 and 16 arranged to oppose each other through the ball holding member 14 along the traveling direction of the automobile, and an electrode plate 17 adjacent to the leaf spring 15 and opposing the leaf spring 16 are mounted in the housing body 12. The ball holding member 14 is made of an insulating material, e.g., a synthetic resin, into a substantially cylindrical shape, and a funnel-like recessed portion 14a having an inverted conical shape for supporting a magnetic ball 18 is as a spherical object formed in its upper portion. A permanent magnet 19 exposed to the lowest portion of the recessed portion 14a to magnetically attract the ball 18 is fixed to the axial portion of the ball holding member 14.

Figure 2:
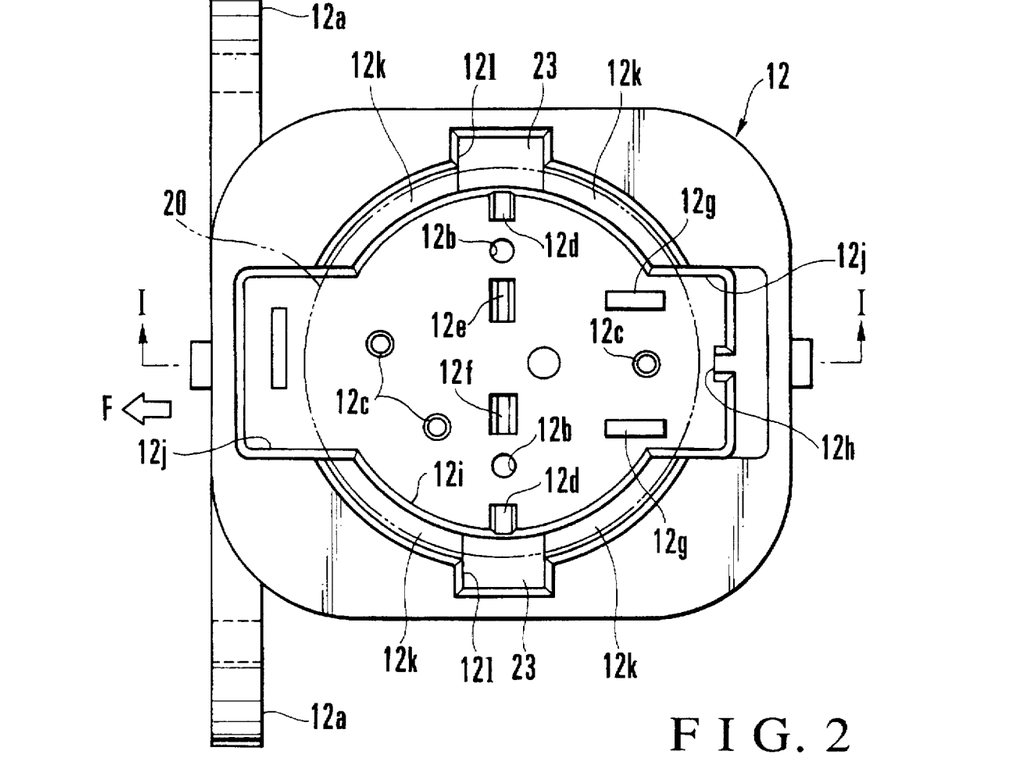
FIG. 2 is a plan view of a housing body shown in FIG. 1.

The ball holding member 14 is fixed to the housing body 12 by pressing pins (not shown) extending vertically downward from its lower surface into press-fit holes 12b formed in the inner bottom portion of the housing body 12, as shown in FIG. 2, to form a gap g between the lower surface of the ball holding member 14 and the inner bottom surface of the housing body 12. Pins 12c (to be described later) for positioning the leaf springs 15 and 16 and electrode plate 17 extend vertically upward from the inner bottom surface of the housing body 12. The outer circumferential portion of the ball holding member 14 is fitted on positioning projection ridges 12d standing on the inner circumferential portion of the housing body 12 to extend in the vertical direction.

Figure 6:
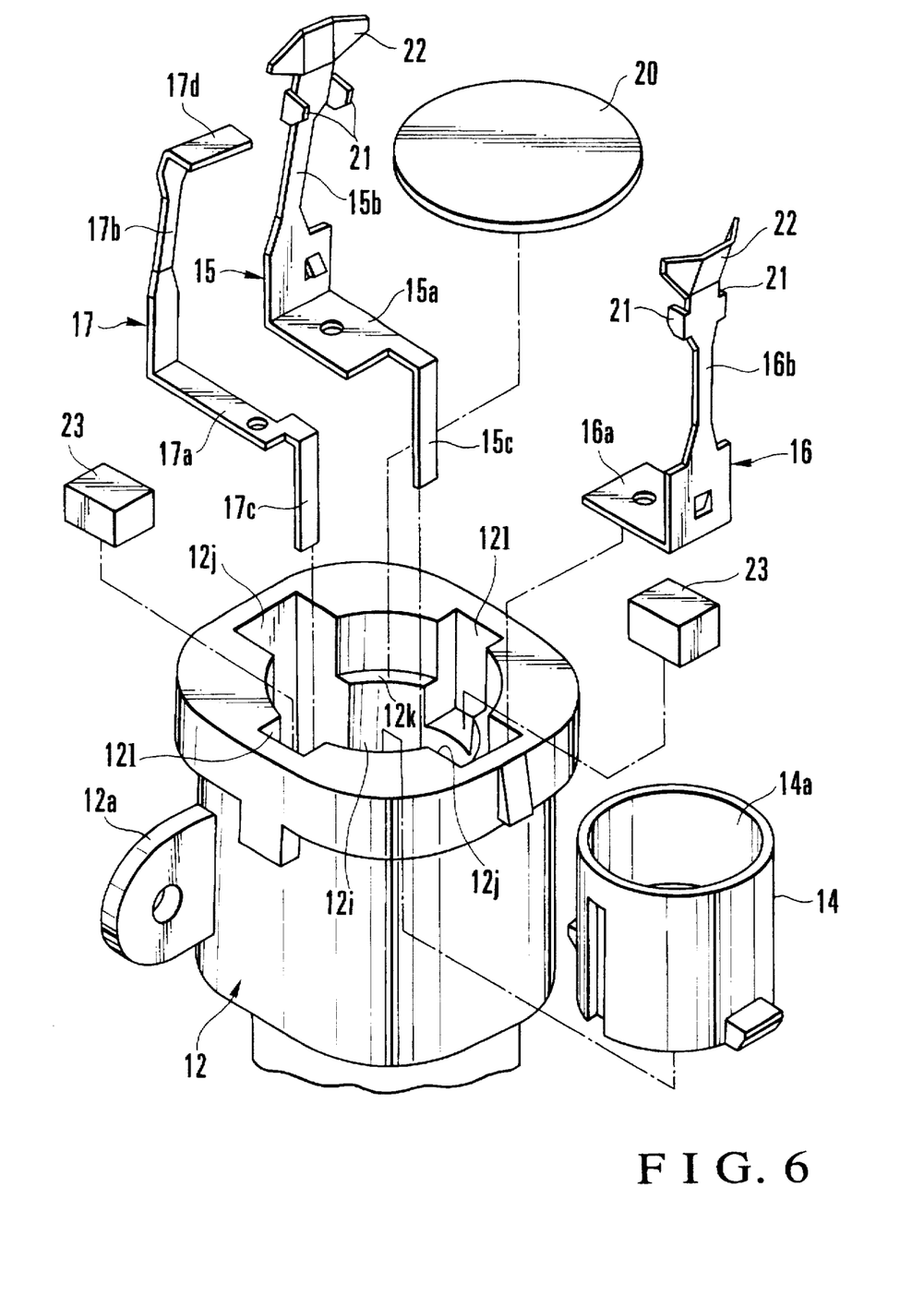
FIG. 6 is an exploded perspective view of the acceleration switch shown in FIG. 1 excluding a cover.

The leaf springs 15 and 16 and the electrode plate 17 are formed of a spring material, e.g., phosphor bronze, having conductivity and respectively have horizontal portions 15a, 16a, and 17a extending along the inner bottom surface of the housing body 12 and upwardly extending portions 15b, 16b, and 17b each extending upward from one end of a corresponding one of the horizontal portions 15a, 16a, and 17a, as shown in FIG. 6. The thickness of each of the leaf springs 15 and 16 and electrode plate 17 is set equal to the size of the gap g.

The leaf springs 15 and 16 are disposed such that their upwardly extending portions 15b and 16b correspond to the front and rear sides of the automobile body with respect to the ball holding member 14. As show n in FIG. 6, the leaf spring 15 whose upwardly extending portion 15b corresponds to the front side of the automobile body further has a terminal portion 15c obtained by bending the distal end of the horizontal portion 15a to extend downward, and is fixed by fitting this terminal portion 15c in a through hole 12e (FIG. 2) of the housing body 12. The electrode plate 17 similarly has a terminal portion 17c obtained by bending the distal end of the horizontal portion 17a, and is fixed by fitting this terminal portion 17c in a through hole 12f (FIG. 2) of the housing body 12. The lead wires (not shown) of a fuel supply pump are connected to the terminal portions 15c of the leaf spring 15 and the terminal portion 17c of the electrode plate 17.

The leaf spring 16 is fixed to the housing body 12 by fitting its horizontal portion 16a between a pair of positioning projections 12g (FIGS. 2 and 3) extending vertically upward from the inner bottom surface of the housing body 12. The horizontal portions 15a and 16a of the leaf springs 15 and 16, and the horizontal portion 17a of the electrode plate 17 are positioned as the pins extending vertically upward from the inner bottom surface of the housing body 12 extend through them. To fix the leaf springs 15 and 16 and the electrode plate 17 to the housing body 12, their horizontal portions may be adhered and fixed on the inner bottom surface of the housing body 12 with an adhesive.

Figure 3:
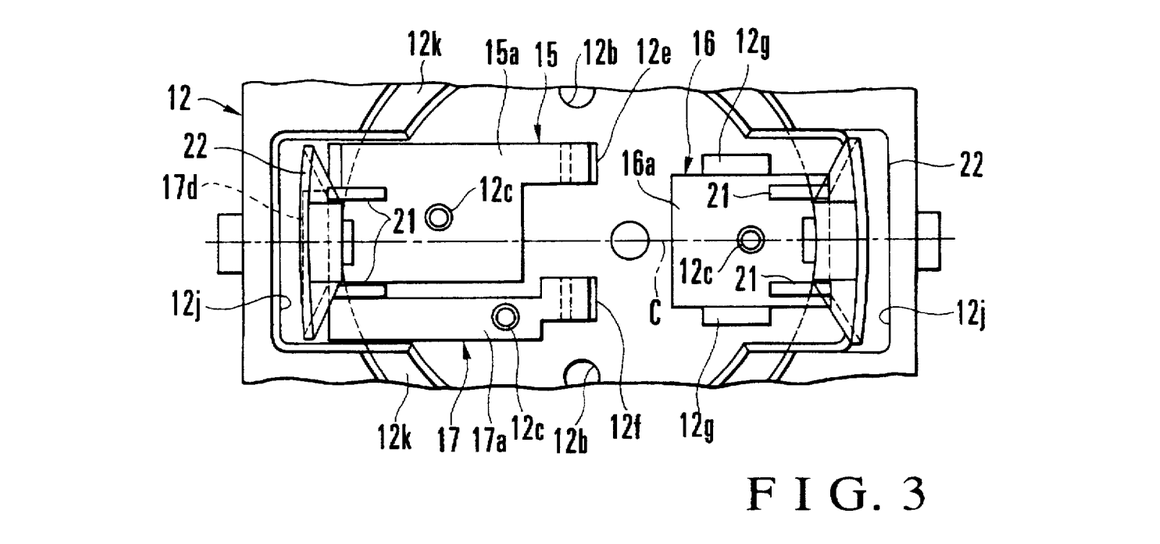
FIG. 3 is an enlarged plan view of the main part of the housing body on which leaf springs and an electrode plate are mounted.

The horizontal portions 15a and 17a of the leaf spring 15 and electrode plate 17 have two-dimensional matching shapes such that they do not come into contact with each other, as shown in FIG. 3. The upwardly extending portion 17b of the electrode plate 17 is formed to have an upper end serving as a free end, and has, at its upper end portion, a contact 17d bent toward the leaf spring 16 to overlap the upwardly extending portion 17b of the electrode plate 17. The upwardly extending portion 17b of the electrode plate 17 is slightly imparted with swing properties so that, in the switch inoperative state (in a state wherein the electrical circuit is closed) shown in FIG. 1, the contact 17d comes into contact with the upwardly extending portion 15b of the leaf spring 15 from a portion corresponding to the front side of the automobile body.

The upwardly extending portions 15b and 16b of the leaf springs 15 and 16 are formed to have upper ends serving as free ends in the same manner as the electrode plate 17, and the upper end portions of the upwardly extending portions 15b and 16b are imparted with swing properties so that they come close to each other. As shown in FIG. 3, the upwardly extending portions 15b and 16b are disposed such that the centers of their upper portions are located on an imaginary line C extending through the center of the ball 18 magnetically attracted by the ball holding member 14 and parallel to the front-and-rear direction of the automobile body, so that the upwardly extending portions 15b and 16b sandwich a contact opening/closing member 20 with a pressure. This contact opening/closing member 20 is made of a magnetic material into a disk.

As described above, while the upwardly extending portions 15b and 16b sandwich the contact opening/closing member 20 at a horizontal initial position, i.e., when the switch is inoperative, they extend vertically. The surface of the upwardly extending portion 16b corresponding to the rear side of the automobile body is supported by a vertical surface 12h of the housing body 12. With this arrangement, in the switch inoperative state wherein the leaf springs 15 and 16 sandwich the contact opening/closing member 20 at the horizontal initial position, the upwardly extending portion 15b of the leaf spring 15 elastically deforms to the front side of the automobile body to come into contact with the contact 17d of the electrode plate 17. Then, the contact 17d is biased to the front side of the automobile body through the leaf spring 15, and accordingly the elastic force of the electrode plate 17 also acts on the contact opening/closing member 20 through the leaf spring 15.

As shown in FIG. 6, at each of portions of the upwardly extending portions 15b and 16b of the leaf springs 15 and 16 that sandwiches the contact opening/closing member 20, a pair of support segments 21 for supporting the contact opening/closing member 20 when the switch is inoperative and a receiving segment 22 for supporting the contact opening/closing member 20 when the switch is operative are provided integrally. The receiving segments 22 are disposed on upper sides of the upwardly extending portions 15b and 16b than the support segments 21, and are formed to be gradually inclined and tapered such that the gap between the receiving segments 22 is increased upward. Each receiving segment 22 has a substantially arcuated horizontal section so that it can support the circumferential edge of the disk-shaped contact opening/closing member 20 easily.

When the switch is inoperative, the contact opening/closing member 20 is sandwiched at the horizontal initial position by the pair of leaf springs 15 and 16 imparted with swing properties, and is simultaneously supported by the housing body 12 as well. The structure of the housing body 12 will be described. As shown in FIGS. 2 and 6, the inner circumferential portion of the housing body 12 forms a circular hole 12i, a pair of leaf spring accommodating portions 12j, stepped portions 12k, and a pair of recessed portions 12l. The circular hole 12i accommodates the ball holding member 14 in the lower half of its central portion. The pair of leaf spring accommodating portions 12j are formed in the inner circumferential surface of the circular hole 12i to correspond to the front-and-rear direction of the automobile body. The stepped portions 12k are partially formed in the upper portion of the circular hole 12i to increase the opening diameter of the circular hole 12i. The pair of recessed portions 12l are formed in the inner circumferential surface of the circular hole 12i to correspond to the right-and-left direction of the automobile.

The leaf spring accommodating portions 12j are opposed by the upwardly extending portions 15b, 16b, and 17b to accommodate the leaf springs 15 and 16 and the electrode plate 17. The stepped portions 12k are formed to have an opening diameter that allows the contact opening/closing member 20 to be fitted in them. When the switch is inoperative, the lower surface of the contact opening/closing member 20 is in contact with the stepped portions 12k to be held by them. The recessed portions 12l are formed lower than the stepped portions 12k to fix permanent magnets 23. The upper surfaces of the permanent magnets 23 form the same level as that of the stepped portions 12k. Thus, when the switch is inoperative, the contact opening/closing member 20 is placed on the stepped portions 12k while its portions corresponding to the front and rear portions of the automobile body are sandwiched by the pair of leaf springs 15 and 16 and its portions corresponding to the right and left portions of the automobile body are attracted by the pair of permanent magnets 23.

As shown in FIG. 1, the lid-like cover 13 for closing the upper opening of the housing body 12 has a cylindrical portion 13a projecting upward from the central portion and having an opening at its upper portion. A reset member 24 is mounted in the cylindrical portion 13a to be vertically movable. The reset member 24 has a disk portion 24a to fit with the inner circumferential surface of the upper opening of the cylindrical portion 13a, and a cylindrical pressing element 24b to vertically movably fit in a boss 13b at the axial portion of the cover 13. The pressing element 24b has a horizontal, flat lower surface for pressing the contact opening/closing member 20.

A compression coil spring 25 for biasing the reset member 24 upward is elastically mounted between the lower surface of the circular disk portion 24a of the reset member 24 and the upper surface of the cover 13. Pawl portions 13c are provided on the upper end of the inner circumferential surface of the cylindrical portion 13a of the cover 13 to prevent the reset member 24 from coming off upward.

The operation of the acceleration switch 11 having the above arrangement will be described. First, in the switch inoperative state wherein the contact opening/closing member 20 is held at the horizontal initial position, the leaf spring 15 comes into contact with the electrode plate 17 to close the electrical circuit, as shown in FIG. 1. Hence, the power supply circuit of the fuel supply pump constituted by the electrical circuit is closed, and the automobile in which the acceleration switch 11 is mounted can drive.

When the automobile during driving makes a sudden stop and the resultant initial force acting in the forward direction of the automobile is larger than a predetermined value, the ball 18 of the acceleration switch 11 rides up the tilt surface of the ball holding member 14 with an inertia toward the leaf spring 15 against the magnetic attracting force of the permanent magnet 19. The ball 18 rotatably moves to a position indicated by a chain double-dashed line in FIG. 1 to abut against the lower surface of the contact opening/closing member 20, and further rolls to press the contact opening/closing member 20 upward.

Figure 4:
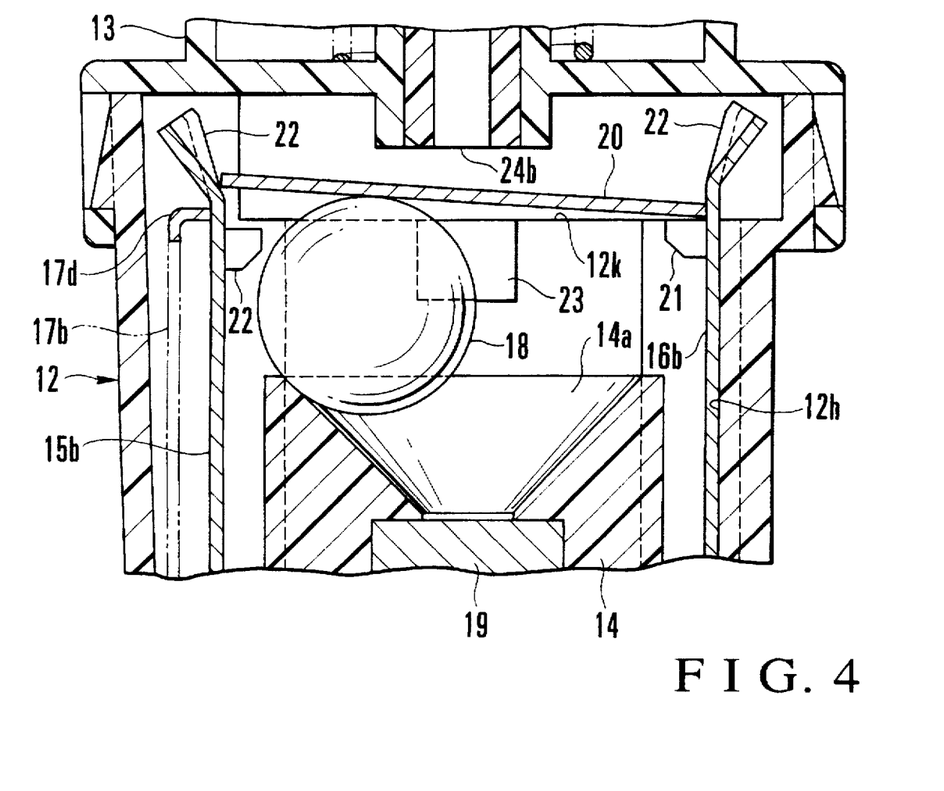
FIG. 4 is a sectional view of the main part of the acceleration switch in which the ball has pushed up the contact opening/closing member.

At this time, if the pressure applied by the ball 18 is larger than the sum of the resistance consisting of the frictional resistance between the contact opening/closing member 20 and the leaf spring 15 and the magnetic attracting force of the pair of permanent magnets 23, the contact opening/closing member 20 is shifted from the horizontal initial position and its end portion corresponding to the front side of the automobile body is pushed upward, as shown in FIG. 4. The end portion of the contact opening/closing member 20 that has been pushed upward is supported by the tilt receiving segment 22 formed at the uppermost portion of the leaf spring 15.

Figure 5:
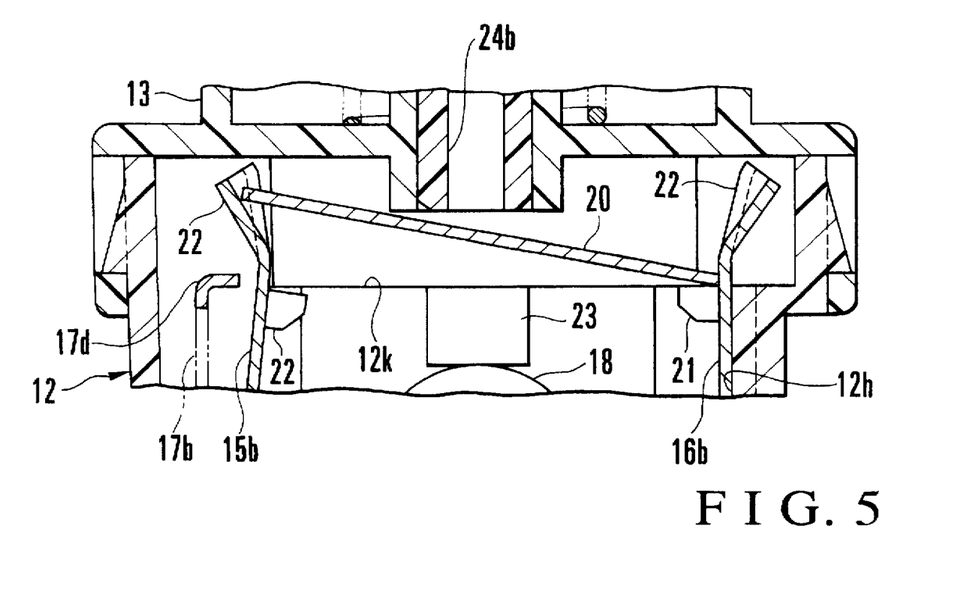
FIG. 5 is a sectional view of a contact opening/closing member portion showing a state wherein an electrical circuit is open.

Since the receiving segment 22 is biased toward the leaf spring 16 by the elastic force of the leaf spring 15, the end portion of the contact opening/closing member 20 is pushed upward to slide along the receiving segment 22, as shown in FIG. 5. When the end portion of the contact opening/closing member 20 is pushed upward, the elastic force of the electrode plate 17 to act on the contact opening/closing member 20 is also effected.

As the end portion of the contact opening/closing member 20 is shifted from the horizontal initial position to move upward on the receiving segment 22, the leaf spring 15 moves to separate from the electrode plate 17, and the electrical contact between the leaf spring 15 and the electrode plate 17 is interrupted, thus opening the electrical circuit. In other words, the acceleration switch 11 is set in the operative state to open the power supply circuit of the fuel supply pump. As a result, power supply to the fuel supply pump is cut off to stop the fuel supply operation, thereby stopping the engine.

According to the above embodiment, after the end portion of the contact opening/closing member 20 moves until it is supported by the receiving segment 22 of the leaf spring 15, the contact opening/closing member 20 will not be reset to the horizontal initial position at least by the elastic force of the leaf spring 15 and electrode plate 17. Thus, the operative state of the switch is held.

To reset, to the horizontal initial position, the contact opening/closing member 20 whose end portion is supported by the receiving segment 22 of the leaf spring 15, the reset member 24 is depressed against the elastic force of the compression coil spring 25. More specifically, as the reset member 24 is depressed, the pressing element 24$b$ biases the contact opening/closing member 20 downward. Accordingly, the end portion of the contact opening/closing member 20 moves downward while it slides along the side surface of the leaf spring 15 to shift the upwardly extending portion 15$b$ to the front side of the automobile body. When the flat surface at the lower end of the pressing element 24$b$ entirely comes into contact with the upper surface of the contact opening/closing member 20, the contact opening/closing member 20 is set horizontal.

When the contact opening/closing member 20 is pushed downward by the permanent magnets 23 until it is supported by the stepped portions 12$k$ of the housing body 12 and the support segments 21 of the leaf springs 15 and 16, it is sandwiched by the pair of leaf springs 15 and 16 in the front-and-rear direction of the automobile body and attracted by the permanent magnets 23 in the right-and-left direction of the automobile body, to be reset to the horizontal initial position.

Therefore, when opening/closing the power supply circuit of the fuel supply pump, this acceleration switch 11 can directly open/close the electrical circuit serving as the power supply circuit with the contact opening/closing member 20. While the contact opening/closing member 20 is held by the pair of leaf springs 15 and 16 and the permanent magnets 23, it acts on the leaf spring 15 to forcibly press against the electrode plate 17, thereby reliably maintaining the closed state of the electrical circuit. The contact opening/closing member 20 can be reset to the horizontal initial position by only the downward movement of the reset member 24.

In the above embodiment, the ball 18 rotatably moves toward the leaf spring 15 of the acceleration switch 11. However, even if the ball 18 rolls toward the leaf spring 16, the electrical circuit can be opened similarly. More specifically, the acceleration switch 11 can be realized by mounting it in the automobile body such that the leaf spring 15 and the electrode plate 17 are located to correspond to the rear side of the automobile body. Other than the power supply circuit of the fuel supply pump, the electrical circuit of the acceleration switch 11 can be applied to the control circuit of a fuel cut-off valve connected to a fuel supply system, a door lock control circuit, and the like.

The acceleration switch 11 described above is set such that the ball 18 rides up the tilt surface of the ball holding member 14 when an acceleration of 12 G in gravitational acceleration acts on it. In the above embodiment, a mass m of the ball 18 was set to 5.62 g, and an angle θ of the tilt surface of the ball holding member 14 was set to 45°.

An inertia force F required for causing the ball 18 to rotatably move on the tilt surface against the magnetic attracting force of the permanent magnet 19 of the ball holding member 14 under the above conditions was calculated from the following equation.

In this equation, an acceleration α is 980 cm/sec².

$$F = m\alpha/\tan\theta - mg$$
$$= 60.7 \times 980 \text{ dyn}$$
$$= 60.7 \text{ gf}$$

As the permanent magnet 19, one having a magnetic attracting force of 58 gf was employed so that the ball 18 could roll with this inertia force.

As has been described above, in the acceleration switch according to the present invention, the electrical circuit can be directly opened/closed with a contact opening/closing member. Therefore, the number of components can be decreased as compared to in a conventional acceleration switch, decreasing the cost. When the switch is inoperative, the contact opening/closing member acts on the leaf springs to close the electrical circuit constituted by the leaf springs and the electrode plate. Even if vibration is applied to the acceleration switch, chattering will not occur. When the switch is operative, it can be reset to the inoperative state by only the downward movement of the reset member. A space where the arms can pivot becomes unnecessary when compared to in the conventional acceleration switch, thus downsizing the housing.

What is claimed is:

1. An acceleration switch comprising:
   a spherical object;

a holding member having a tilt surface along which said spherical object rolls and holding said spherical object in a bottom portion of said tilt surface;

a magnetic contact opening/closing member disposed at a horizontal initial position above said holding member, a first end portion of said contact opening/closing member being pushed upward from the initial position by said spherical object that rolls along said tilt surface of said holding member with an inertia;

a first permanent magnet for attracting said contact opening/closing member at the initial position with a first predetermined holding force;

first and second leaf springs disposed to oppose each other on rolling and non-rolling sides of said spherical object through said holding member and having upper free ends for sandwiching the first and a second end portions of said contact opening/closing member at the initial position, at least said first leaf spring being made of a conductive material and imparted with swing properties to swing in a direction to come close to said second leaf spring from a connecting position; and an electrode plate disposed on a counter-second leaf spring side at a predetermined gap from said first leaf spring, said first leaf spring and electrode plate structurally and electrically connecting and disconnecting at the connecting position, wherein when said contact opening/closing member is at the initial position, said first leaf spring is pressed by the first end portion of said contact opening/closing member in a direction to engage said electrode plate against the swing properties thereof and when the first end portion of said contact opening/closing member is shifted from the initial position, said first leaf spring swings in a direction so as be adjacent to said second leaf spring in accordance with the swing properties thereof to be disconnected from said electrode plate.

2. A switch according to claim 1, further comprising a second permanent magnet at said bottom portion of said tilt surface of said holding member to attract said spherical object with a second predetermined holding force, and wherein said spherical object is made of a magnetic material.

3. A switch according to claim 1, further comprising a bottomed cylindrical housing body having an opening portion which opens upward to accommodate said holding member, said electrode plate, and said first and second leaf springs, and wherein said contact opening/closing member is formed into a disk to engage with a portion near said opening portion of said housing body when located at the initial position.

4. A switch according to claim 3, further comprising a cover to fit in said opening portion of said housing body and a stepped portion formed in an inner circumferential surface of said housing body near said opening portion, and wherein said contact opening/closing member engages with said stepped portion of said housing body when located at the initial position and is accommodated in a space formed by said housing body and said cover.

5. A switch according to claim 1, further comprising a reset member supported above said contact opening/closing member to be vertically movable to depress said contact opening/closing member downward upon a depressing operation, thereby resetting said contact opening/closing member to the initial position, and a spring member provided on a housing in which said holding member, electrode plate, first and second leaf springs are accommodated for biasing said reset member upward.

6. A switch according to claim 5, wherein said reset member has a horizontal, flat lower end surface, and said contact opening/closing member returns to the initial position when said reset member is depressed until said lower end surface thereof of said reset member is entirely brought into contact with said contact opening/closing member.

7. A switch according to claim 1, wherein said first and second leaf springs have, at distal ends of said upper free ends thereof, accepting portions that are inclined such that a gap therebetween is increased upward to support said end portion of said contact opening/closing member which has been shifted from the initial position, and as said end portion of said contact opening/closing member moves on a corresponding one of said accepting portions of said leaf springs upward, said first leaf spring swings in a direction to separate from said electrode plate.

8. A switch according to claim 7, wherein said accepting portion of said first leaf spring has a horizontal section corresponding to a shape of said end portion of said contact opening/closing member.

* * * * *